US008715797B2

(12) United States Patent
Fouquay et al.

(10) Patent No.: US 8,715,797 B2
(45) Date of Patent: May 6, 2014

(54) ADHESIVE COMPOSITION FOR A DEBONDABLE SELF-ADHESIVE LABEL

(75) Inventors: Stéphane André Fouquay, Mont Saint Aignan (FR); David Goubard, Compiegne (FR)

(73) Assignee: Bostik S.A., Paris (FR)

( * ) Notice: Subject to any disclaimer, the term of this patent is extended or adjusted under 35 U.S.C. 154(b) by 405 days.

(21) Appl. No.: 12/525,438

(22) PCT Filed: Jan. 31, 2008

(86) PCT No.: PCT/FR2008/000112
§ 371 (c)(1), (2), (4) Date: Dec. 29, 2009

(87) PCT Pub. No.: WO2008/110685
PCT Pub. Date: Sep. 18, 2008

(65) Prior Publication Data

US 2010/0092703 A1 Apr. 15, 2010

(30) Foreign Application Priority Data

Feb. 2, 2007 (FR) ..................................... 07 00735

(51) Int. Cl.

| | |
|---|---|
| ***B32B 1/08*** | (2006.01) |
| ***C08K 5/09*** | (2006.01) |
| ***B29B 17/00*** | (2006.01) |
| ***C08K 5/04*** | (2006.01) |

(52) U.S. Cl.
USPC ......... 428/35.7; 428/34.4; 524/400; 524/394; 241/19

(58) Field of Classification Search
USPC ........ 428/34.4, 35.7, 441, 500; 524/271, 394, 524/400; 241/19
See application file for complete search history.

(56) References Cited

U.S. PATENT DOCUMENTS

| | | | | |
|---|---|---|---|---|
| 3,950,291 | A | 4/1976 | Jurrens | |
| 5,182,323 | A | 1/1993 | Russell | |
| 5,385,965 | A | 1/1995 | Bernard et al. | |
| 6,191,189 | B1 | 2/2001 | Cinelli et al. | |
| 7,166,341 | B2 | 1/2007 | Heemann et al. | |
| 2003/0055179 | A1 | 3/2003 | Ota et al. | |
| 2003/0207966 | A1* | 11/2003 | Ohtsuka et al. | 524/88 |
| 2004/0161567 | A1 | 8/2004 | Truog et al. | |
| 2004/0191459 | A1 | 9/2004 | Driesten | |
| 2006/0229411 | A1* | 10/2006 | Hatfield et al. | 525/88 |
| 2006/0235122 | A1* | 10/2006 | Paul et al. | 524/284 |
| 2006/0263595 | A1* | 11/2006 | Scheubner | 428/343 |
| 2007/0055014 | A1 | 3/2007 | Lu et al. | |
| 2007/0160833 | A1 | 7/2007 | Maak et al. | |

FOREIGN PATENT DOCUMENTS

| | | |
|---|---|---|
| EP | 0 150 218 | 8/1985 |
| WO | WO 99/13016 | 3/1999 |

OTHER PUBLICATIONS

Eastman Data Sheet for FLORAL 85E (2008), available at http:/www.eastman.com/Products/Pages/ProductHome.aspx?Product=71049749&1ist=Chemicals (accessed Nov. 14, 2012).

* cited by examiner

*Primary Examiner* — Erik Kashnikow
(74) *Attorney, Agent, or Firm* — Hunton & Williams LLP

(57) ABSTRACT

Hot-melt pressure-sensitive adhesive (HMPSA) composition is disclosed comprising:

a) 25 to 50% of a blend of SBS and SB styrene block copolymers;
b) 45 to 75% of compatible tackifying resins having a softening temperature of between 80 to 150° C.; and
c) 0.5 to 5.5% of fatty acids, the hydrocarbon chain of which comprises 10 to 22 carbon atoms.

Also disclosed are a multilayer system comprising an HMPSA layer, a printable support layer and an adjacent protective layer. A self-adhesive label and process for recycling a labeled article with debonding of said label by immersing the article in a hot basic aqueous solution are also disclosed.

16 Claims, No Drawings

ADHESIVE COMPOSITION FOR A DEBONDABLE SELF-ADHESIVE LABEL

CROSS-REFERENCE TO RELATED APPLICATIONS

This application is the U.S. National Stage filing of International Application No. PCT/FR2008/000112, filed Jan. 31, 2008, which claims priority to French Patent Application No. FR 07 00735, filed Feb. 2, 2007, the disclosures of both of which are hereby incorporated in their entirety by reference.

FIELD OF THE INVENTION

The subject of the present invention is a hot-melt pressure-sensitive composition suitable for bonding self-adhesive labels that can be debonded during a process for recycling the articles to which they have been fastened (such as packages and/or containers, for example glass bottles). The invention also relates to a multilayer system comprising said composition, to a self-adhesive label, to the corresponding labeled article and to a process for recycling said article, which includes a step of debonding the label.

BACKGROUND OF THE INVENTION

Many labeled packages and/or containers are subjected, after removal of their contents, to cleaning (or recycling) treatments either for the purpose of reusing them or, after destruction, for the purpose of recovering their constituent material. Such treatments often require the label to be completely separated from the article to which it is fastened, without leaving adhesive residues on the surface of said article, so as to make the recycling process easier.

These recycling processes, such as the one used for cleaning spent glass bottles, for example beer bottles generally include a step of immersing the article to be cleaned in basic aqueous compositions maintained at temperatures between 60 and 100° C. The purpose of such a step is the debonding of the label fastened to the article and its separation therefrom.

Pressure-sensitive adhesives or PSAs are substances giving the support coated therewith a tack at room temperature, which allows its instantaneous adhesion to a substrate under the effect of brief slight pressure. PSAs are widely used for the manufacture of self-adhesive labels, which are fastened to articles for the purpose of presenting information (such as a barcode, description, price) and/or for decorative purposes.

PSAs are generally applied by continuous coating processes to the entire surface of a printable support layer of large dimensions, consisting of paper or a film of polymer material having one or more layers. The adhesive layer that covers the printable support layer is itself covered with a protective layer (often called a “release liner”), consisting for example of a siliconized film. The multilayer system obtained is generally packaged by being wound up in the form of large reels up to 2 m in width and 1 m in diameter, which can be stored and transported.

This multilayer system can be subsequently converted into self-adhesive labels that can be applied by the end user by means of conversion processes that include the printing of desired decorative elements and/or information on the printable side of the support layer, followed by cutting to the desired shape and dimensions. The protective layer may be easily removed without modifying the adhesive layer that remains fastened to the printable support layer. After separation from its protective layer, the label is applied at a temperature close to the ambient temperature to the article to be coated, either manually or with the use of labellers on automated packaging lines.

PSAs, because of their high room-temperature tack, make it possible for the label to be rapidly bonded to the article to be coated (for example bottles), suitable for obtaining high industrial production rates.

U.S. Pat. No. 3,763,117 describes an acrylate-based PSA having good adhesive properties, which allows easy separation when hot using a basic aqueous solution.

U.S. Pat. No. 5,385,965 also describes a PSA making it possible, after coating on a paper support or film of a polymer material, to obtain a label that can be detached from the substrate through the action of a hot alkaline solution. This PSA takes the form of an aqueous emulsion of an acrylate-based copolymer or of a styrene-butadiene copolymer. The solids content of this emulsion does not exceed 70%, so that coating this PSA on the support layer is complicated by the need for an emulsion drying step. In addition, such adhesives have the drawback of passing partially into a solution or into suspension in the aqueous compositions used for recycling labeled bottles, thereby imposing on industrial installations constraints in the reprocessing of these compositions before discharge into the environment.

U.S. Pat. No. 4,680,333 teaches a hot-melt pressure-sensitive adhesive composition comprising a styrene/isoprene/styrene block copolymer, an aliphatic resin having a low softening temperature and a metal salt of a fatty acid. This composition makes it possible, after a paper support has been coated with it and this support has been bonded to a substrate, to debond the thus fastened support at any moment, dry and at room temperature, without any other treatment, thus giving the coated support a repositionable adhesive behavior.

Hot-melt adhesives or hot melts (HMs) are substances that are solid at room temperature and contain neither water nor solvent. They are applied in the melt state and solidify upon being cooled, thus forming a joint for fastening the substrates to be assembled. Certain hot melts are formulated so as to give the support coated therewith a relatively hard and tack-free character. Other hot melts provide the support with a relatively soft and high-tack character. PSAs are widely used for the manufacture of self-adhesive labels the corresponding adhesives are denoted by hot-melt pressure-sensitive adhesives or HMPSAs.

The HMPSA composition described by the patent U.S. Pat. No. 4,680,333 does not allow the label coated therewith to bond permanently to a substrate, since said label may be debonded dry at any moment.

SUMMARY OF THE INVENTION

The objective of the present invention is to provide an adhesive which allows a label to be permanently bonded to an article, such as a package and/or a container (for example glass bottles) and which also offers the possibility of the label being rapidly and completely debonded during a step of immersing the labeled article in a basic aqueous solution at high temperature, the adhesive essentially remaining fastened to the label after its separation.

DETAILED DESCRIPTION

It has now been discovered that this objective can be completely or partly achieved by means of the hot-melt pressure-sensitive adhesive composition forming the subject matter of the present invention.

The invention therefore relates to a hot-melt pressure-sensitive adhesive (HMPSA) composition comprising:

a) 25 to 50% of a blend of styrene block copolymers consisting of 20 to 90% of one or more SBS (styrene/butadiene/styrene) triblock copolymers and 10 to 80% of one or more SB (styrene/butadiene) diblock copolymers, the overall content of styrene units of said blend being between 15 and 40%;

b) 45 to 75% of one or more compatible tackifying resins having a softening temperature of between 80 and 150° C.; and c) 0.5 to 5.5% of one or more fatty acids, the hydrocarbon chain of which comprises 10 to 22 carbon atoms, in acid form or in the form of a salt of an alkali or alkaline-earth metal.

Unless otherwise indicated, the percentages used in the present text for expressing quantities correspond to weight/weight percentages.

The composition according to the invention makes it possible to achieve, after an oriented polypropylene (OPP) support has been coated therewith, permanent adhesion of said support to a glass substrate, corresponding to an adhesiveness (measured by the 180° peel test on glass) of advantageously between 2 and 15 N/cm, preferably between 2 and 10 N/cm. The adhesion of the support to the glass substrate is maintained over time, including in the presence of high relative humidity. However, the OPP support thus fastened to the glass substrate easily and completely debonds during a step of immersion in a basic aqueous medium, without leaving any trace of adhesive on said substrate.

Unlike the known acrylate-based PSAs of the prior art, the composition according to the invention is an HMPSA, the solid form of which at room temperature enables it to be advantageously applied by coating in the melt state onto the printable support layer of the label, without it being necessary to employ a drying step.

In addition, in the immersion step, the adhesive essentially remains fastened to the OPP support after the latter has been debonded from the glass substrate. Thus, the adhesive does not dissolve (or is not dispersed) in the aqueous compositions used in a recycling treatment, thereby avoiding additional washing bath decontamination treatments.

The styrene/butadiene/styrene triblock and styrene/butadiene diblock copolymers of the composition according to the invention have a weight-average molecular weight $M_w$ of between 60 kDa and 400 kDa, and are generally linear. Unless otherwise indicated, the weight-average molecular weights $M_w$ that are given in the present text are expressed in daltons (Da) and are determined by GPC (gel permeation chromatography), the column being calibrated with polystyrene standards.

The blend of triblock and diblock styrene copolymers preferably consists of 60 to 80% SBS and 20 to 40% SB. The overall content of styrene units of the blend is advantageously between 25 and 35%. SBS and SB copolymers are commercially available, including in the form of triblock/diblock blends. Europrene® Sol T6320 and Europrene® Sol T166 from the company Polimeri Europa (Italy) or Kraton® D1152 from the company Kraton are examples of such products.

Europrene® Sol T6320 is a blend consisting of about 25% SBS triblock copolymer of about 170 kDa $M_w$ and 75% SB diblock copolymer of about 70 kDa $M_w$, each of the copolymers having about 30% styrene. Europrene® Sol T166 is a blend consisting, respectively, of 90% and 10% of an SBS triblock ($M_w$ about 121 kDa) and of an SB diblock ($M_w$ about 64 kDa), each of these copolymers having about 30% styrene.

The tackifying resin or resins have weight-average molecular weights $M_w$ of generally between 300 and 5000 and are chosen in particular from:

(i) natural or modified colophony rosins, such as for example the colophony extracted from pine gum and wood colophony extracted from tree roots, and their hydrogenated, dehydrogenated, dimerized or polymerized derivatives or esterified by monoalcohols or polyols such as glycerol;

(ii) resins obtained by the hydrogenation, polymerization or copolymerization (with an aromatic hydrocarbon) of mixtures of unsaturated aliphatic hydrocarbons having about 5, 9 or 10 carbon atoms derived from petroleum fractions;

(iii) terpene resins generally resulting from the polymerization of terpene hydrocarbons, such as for example monoterpene (or pinene) in the presence of Friedel-Crafts catalysts, optionally modified by the action of phenols; and (iv) copolymers based on natural terpenes, for example styrene/terpene, α-methyl styrene/terpene and vinyltoluene/terpene.

These resins are commercially available, and among those having a softening temperature between 80 and 150° C. that may be mentioned are, for example, in the following product categories below:

(i) Sylvalite® RE 100S from the company Arizona Chemical and Dertoline® G2L and Dertopoline® CG from the French company DRT; and (ii) Escorez® 5600 available from Exxon Chemicals, this being a hydrogenated dicylopentadiene resin modified by an aromatic compound, having a softening temperature of 100° C. and an $M_w$ of about 980 Da; Escorez® 5400, also from Exxon Chemicals with a softening temperature of 100° C.; Wingtack® 86 from the Cray Valley; and Regalite® R5100 from Eastman;

(iii) Dertophene® T from DRT; and Sylvarez® TP95 from Arizona Chemical, which is a phenolic terpene resin with a softening temperature of 95° C. and an $M_w$ of about 1120 Da; and (iv) Sylvarez® ZT105LT from Arizona Chemical, which is a styrene/terpene copolymer with a softening point of 105° C.

The term "compatible tackifying resin" is understood to mean a tackifying resin which, when it is mixed in 50%/50% proportions with an SPS or SB block copolymer, gives a substantially homogeneous blend.

The softening temperature (or point) is determined in accordance with the standardized ASTM E 28 test, the principle of which is as follows. A brass ring about 2 cm in diameter is filled with the resin to be tested in the melt state. After cooling to room temperature, the ring and the solid resin are placed horizontally in a thermostatted glycerol bath, the temperature of which may vary by 5° C. per minute. A steel ball about 9.5 mm in diameter is centered on the solid resin disk. The softening temperature is, during the rise in temperature of the bath at a rate of 5° C. per minute, the temperature at which the resin disk flows by an amount of 25.4 mm under the weight of the ball.

Tackifying resins having a softening temperature between 95 and 110° C. are preferred, such as for example Escorez® 5600 or 5400, Sylvarez® ZT105 LT or Sylvarez® TP95.

The fatty acids in the composition according to the invention have a hydrocarbon chain comprising 10 to 22 carbon atoms. These fatty acids may be chosen from:

(α) saturated or unsaturated, monocarboxylic fatty acids, whether pure or as mixtures; and (β) mixtures of saturated or unsaturated, polycarboxylic fatty acids of the dimer or trimer type.

The hydrocarbon radical of the monocarboxylic fatty acids (α) may be linear or branched. When pure acids are used, hydrocarbon radicals comprising between 14 and 20 carbon atoms are preferred.

The use of mixtures of monocarboxylic fatty acids (α) is advantageous since these mixtures derive from animal or vegetable fats and are called "fractions". These fractions are rich in hydrocarbon radicals comprising 16 to 18 carbon atoms. Nonlimiting examples of such fractions that may be mentioned include:

oleic fatty acids, such as RADIACID® 208 available from the company Oleon;

sunflower, copra and rapeseed fatty acids (RADIACID® 166) and soya fatty acids (RADIACID® 110 and RADIACID® 121);

tallow fatty acids, such as RADIACID® 401 and RADIACID® 403; and hydrogenated tallow fatty acids, such as RADIACID® 408 and RADIACID® 409.

The mixtures (β) of polycarboxylic fatty acids are obtained by dimerization of unsaturated monocarboxylic fatty acid fractions comprising predominantly hydrocarbon radicals containing 18 carbon atoms. The corresponding products are essentially dimers (such as RADIACID® 951 and RADIACID® 970) or a mixture of dimers and trimers (such as RADIACID® 980).

The products (α) and (β) have an acid number (AN) of between 170 and 200 mg KOH/g and an iodine number of between 0 and 140. The acid number represents the amount of free fatty acid and is the number of milligrams of potassium hydroxide needed to neutralize the acidity of 1 gram of fatty acid, determined by titration. The iodine number (IN) represents the number of double bonds in the hydrocarbon radicals and corresponds to the number of grams of iodine attached per 100 grams of fatty acid.

Thus RADIACID® 208 has an AN of between 184 and 196 and an IN of between 75 and 94. RADIACID® 970 has an AN of between 188 and 198 and an IN of less than 94. RADIACID® 980 has an AN of 180 and an IN of less than 94. RADIACID® 403 has an AN of between 192 and 198 and an IN of 42 to 51. Copra fatty acids have an AN of 250 to 264 and an IN of 6 to 9.

Dimer or trimer polycarboxylic fatty acid mixtures (β) are preferred because of better tack. The acid form of the fatty acids employed in the HMPSA according to the invention is particularly advantageous.

According to a preferred embodiment, the HMPSA comprises:

40 to 50% of the blend a) of triblock and diblock copolymers;

45 to 55% of one or more tackifying resins b); and 1 to 5% of one or more fatty acids c).

A 0.1 to 2% amount of one or more stabilizers (or antioxidants) is furthermore preferably included in the composition according to the invention. These compounds are introduced so as to protect the composition from degradation resulting from a reaction with oxygen, which is liable to form through the action of heat, light or residual catalysts on certain raw materials, such as tackifying resins. These compounds may include primary antioxidants, which trap the free radicals and are generally substituted phenols, such as Irganox® 1010 from Ciba-Geigy. The primary antioxidants may be used by themselves or in combination with other antioxidants, such as phosphites like Irgafos® 168, also from Ciba-Geigy, or else with UV stabilizers, such as amines.

The composition according to the invention may also include a plasticizer, such as a paraffinic or naphthenic oil (such as Primol® 352 from Esso) or else a wax of a polyethylene homopolymer (such as A-C® 617 from Honeywell) or a wax of an ethylene/vinyl acetate copolymer, or pigments, dyes or fillers.

The hot-melt self-adhesive composition according to the invention is prepared by simply mixing its components at a temperature of between 130 and 200° C. until a homogeneous compound is obtained. The required mixing conditions are well known to those skilled in the art.

The subject of the present invention is also a multilayer system comprising:

an adhesive layer, consisting of the hot-melt pressure-sensitive composition according to the invention;

a printable support layer adjacent said adhesive layer, consisting of paper or polymer film having one or more layers; and a protective layer adjacent said adhesive layer.

It is preferred to use, as printable support layer, an OPP/PET bilayer film, the OPP layer of which is adjacent the adhesive layer.

The HMPSA according to the invention is applied in the melt state at a temperature of greater than 130° C. to the printable support layer in an amount of between 15 and 30 $g/m^2$ so as to form the adhesive layer. The application is carried out by known coating techniques such as, for example, lipped-nozzle coating (at a temperature of about 160 to 180° C.) or curtain coating (at a temperature of about 120 to 180° C.) The HMPSA is generally applied by a lipped nozzle onto the protective layer, the assembly then being laminated to the support layer (transfer coating). The application of the HMPSA by curtain coating may be carried out directly on the support layer, depending on the coating temperature.

The invention also relates to a self-adhesive label that can be obtained by conversion of the multilayer system described above. The conversion process employed generally includes at least one printing step, for printing on the printable support layer, and a cutting step.

The subject of the invention is also an article coated with said label.

The labeled article is preferably a package or container made of glass or of a usual plastic material chosen from PET (polyethylene terephthalate), PVC (polyvinyl chloride), PE (polyethylene) and PP (polypropylene). A glass bottle is more particularly preferred. The glass bottles in question may or may not have received during their manufacture a coating treatment intended for maintaining their mechanical properties over time and for protecting them from being scratched. Such a treatment leads, for example, to the deposition of a metal oxide layer onto the surface of the glass, said metal oxide layer optionally being covered with an additional layer of waxy nature.

Finally, the invention relates to a process for recycling a labeled article, which includes a step of debonding the label by immersion of the labeled article in a basic aqueous solution maintained at a temperature of between 60 and 100° C., characterized in that the labeled article is as defined above.

Advantageously, the debonding of the label by this process results in its complete separation from the article, without leaving any adhesive residue on the surface of said article and without the adhesive composition contaminating the basic aqueous washing solution. Within the context of industrial implementation of the process, there is as a result less pollution of the washing water and the recycling process is more economic, in particular from the standpoint of the quantity of water consumed. The labels thus separated from the treated articles may be collected and removed from the washing bath by appropriate mechanical means.

The process according to the invention is preferably implemented at a temperature of about 80° C.

The adhesiveness of the HMPSA according to the invention is determined by the 180° peel test on a glass plate, as described in FINAT Test Method No. 1 published in the FINAT Technical Manual, 6th edition, 2001. FINAT is the International Federation for Self-adhesive Label Manufacturers and Converters. The principle of this test is as follows. The OPP side of a support layer, consisting of a 19 μm thick PET film laminated to a 50 μm thick OPP film by means of a bicomponent polyurethane adhesive, is coated beforehand with the HMPSA in an amount of 20 $g/m^2$. A specimen in the form of a rectangular strip (measuring 25 mm×175 mm) is cut from the self-adhesive support thus obtained. This specimen is fastened to a substrate consisting of a glass plate. The assembly obtained is left for 20 minutes at room temperature and is then introduced into a tensile testing machine capable of peeling or debonding the strip at an angle of 180° and with a separation rate of 300 mm per minute. The machine measures the force required to debond the strip under these conditions. The result is expressed in N/cm. The 180° C. peel strength, when bonded to a glass plate, of the adhesives intended for manufacturing self-adhesive labels is generally greater than 2 N/cm, preferably greater than 4 N/cm.

The tack of the HMPSA according to the invention is determined by the loop tack test described in FINAT Test Method No. 9. A 50 μm thick OPP film is coated beforehand with the HMPSA in an amount of 20 $g/m^2$ so as to obtain a rectangular strip measuring 25 mm by 175 mm. The two ends of this strip are joined together to form a loop, the adhesive layer of which is facing outward. The two joined ends are placed in the movable jaw of a tensile testing machine capable of imposing a rate of displacement of 300 mm/minute along a vertical axis, with the possibility of forming a forward-and-back movement. The lower part of the loop placed in the vertical position is firstly put into contact with a horizontal glass plate measuring 25 mm by 30 mm over a square area measuring about 25 mm per side. Once this contact has occurred, the displacement direction of the jaw is reversed. The tack is the maximum value of the force needed for the loop to be completely debonded from the plate. The tack of a PSA is generally equal to or greater than 1 $N/cm^2$.

The hot debondability in basic aqueous medium of labels coated with the HMPSA according to the invention, fastened beforehand to a glass substrate, is determined by the following test.

Glass bottles 5 cm in diameter and about 20 cm in height are used, these being divided into two groups depending on the nature of the constituent glass. This is because glass has two types of surface layer, depending on the coating treatment applied during manufacture of the bottles. The 1st type of layer essentially comprises tin oxide. The 2nd type essentially comprises an oxidized polyethylene wax emulsion applied to a tin oxide layer. The 2nd type of layer is characteristic of new glass bottles. The 1st type is characteristic of glass bottles that have already been immersed in a basic aqueous solution, during at least one cleaning cycle. The 1st group of bottles is denoted hereafter by "SnO" and the 2nd by the abbreviation "PE".

The same support layer is coated with the HMPSA to be tested, the coating conditions being the same as in the 180° peel test. A rectangular (7 cm H 5 cm) label is cut from the self-adhesive support thus obtained and fastened to a glass bottle by simple pressure, the assembly being left for 24 hours at room temperature.

Next, the labeled glass bottle is immersed in a pH 12 water bath thermostatted to 80° C.

After the bottle has been immersed for 60 seconds, the percentage debonding of the label (hereafter called "percent debond") is visually determined for "SnO" type and "PE" type bottles.

The amount of adhesive present in the basic aqueous solution after immersion of the labeled bottle and separation of the label is measured in the following manner. During the implementation of the previous test, the weight P1 of the self-adhesive label before it is fastened to the glass bottle is determined. After the bottle and the label have been immersed for 20 minutes in the basic aqueous solution, the label, which is then debonded from the bottle, is recovered, and dried to constant weight P2. The weight difference P1−P2, expressed as a percentage relative to P1, corresponds to the loss of HMPSA of the self-adhesive label.

The following example is given purely to illustrate the invention, but should not be interpreted as limiting its scope.

EXAMPLE 1

The composition given in Table 1 below was prepared by simple hot mixing of the ingredients at 180° C. This composition contained 0.5% Irganox® 1010 and 0.5% Irgafos® 168. The contents of the other ingredients are indicated in Table 1.

This composition contained 46% of a blend comprising 70% of an SBS triblock copolymer and 30% of an SB diblock copolymer, the overall styrene monomer content of which was 30%.

The result of the 180° peel test on glass of the composition obtained was 4.7 N/cm. The loop tack test gave a value of 1 $N/cm^2$, characteristic of a PSA.

The hot debonding test in basic aqueous medium gave, for both types of bottle, 100% debonding. After separation of the label, no trace of adhesive was observed on the surface of the bottles.

The loss of HMPSA of the label was less than 1%, indicating that the basic aqueous washing solution contained substantially no HMPSA.

EXAMPLES 2 and 3

Example 1 was repeated with the compositions indicated in Table 1, with substantially the same results being obtained.

TABLE 1

| | Content in % | | |
|---|---|---|---|
| Ingredient | Example 1 | Example 2 | Example 3 |
| Europrene ® Sol T166 | 32 | 31 | 31 |
| Europrene ® Sol T6320 | 14 | 14 | 14 |
| Sylvarez ® ZT105LT | 27 | 26 | 26 |
| Escorez ® 5600 | 23 | 22 | 22 |
| Radiacid ® 208 | 3 | 3 | 2 |
| Primol ® 352 | 0 | 3 | 4 |

EXAMPLES 4 to 8

Example 1 was repeated for the compositions indicated in Table 2 and the results of the tests are also indicated in Table 2.

During implementation of the hot debonding test in basic aqueous medium of these examples, no trace of adhesive on the surface of the bottles was observed after separation of the label. The loss of HMPSA of the label was 0%, indicating that the basic aqueous washing solution contained no HMPSA.

| | Content in % | | | | |
|---|---|---|---|---|---|
| Ingredient | Example 4 | Example 5 | Example 6 | Example 7 | Example 8 |
| Europrene ® Sol T166 | 32 | 31 | 31 | 32 | 32 |
| Europrene ® Sol T6320 | 14 | 12 | 14 | 14 | 14 |
| Sylvarez ® ZT105LT | 27 | 25 | 25 | 27 | 27 |
| Escorez ® 5600 | 23 | 20 | 22 | 23 | 23 |
| Radiacid ® 970 | 3 | 3 | — | — | — |
| Radiacid ® 403 | — | — | 3 | — | — |
| Copra acid | — | — | — | 3 | — |
| Radiacid ® 980 | — | — | — | — | 3 |
| Primol ® 352 | — | 3 | 4 | — | — |
| A-C ® 617 | — | 5 | — | — | — |
| 180° peel on glass (N/cm) | 4.7 | 6 | 2 | 3.5 | 6 |
| Loop tack (N/cm$^2$) | 3.4 | 4.6 | 1 | 1 | 4.6 |
| PE % debond | 90 | 100 | 30 | 30 | 80 |
| SnO % debond | 100 | 100 | 100 | 100 | 100 |

The invention claimed is:

1. A hot-melt pressure-sensitive adhesive (HMPSA) composition comprising:

(a) 25 to 50% by weight of a blend of styrene block copolymers comprising 20 to 90% by weight of one or more styrene/butadiene/styrene (SBS) triblock copolymers and 10 to 80% by weight of one or more styrene/butadiene (SB) diblock copolymers, the overall content of styrene units of said blend being between 15 to 40% by weight;

(b) 45 to 75% by weight of one or more compatible tackifying resins having a softening temperature of between 80 and 150° C.; and (c) 0.5 to 5.5% by weight of one or more polycarboxylic fatty acid of the dimer or trimer type, the hydrocarbon chain of which comprises 10 to 22 carbon atoms, in acid form or in the form of a salt of an alkali or alkaline-earth metal.

2. The HMPSA as claimed in claim 1, wherein the blend of triblock and diblock styrene copolymers comprises 60 to 80% by weight SBS and 20 to 40% by weight SB.

3. The HMPSA as claimed in claim 1, wherein the overall content of styrene units of the blend of triblock and diblock styrene copolymers is between 25 to 35% by weight.

4. The HMPSA as claimed in claim 1, wherein the tackifying resins are:

(i) natural or modified colophony rosins and their hydrogenated, dehydrogenated, dimerized or polymerized derivatives or esterified by monoalcohols or polyols;

(ii) resins obtained by the hydrogenation, polymerization or copolymerization of mixtures of unsaturated aliphatic hydrocarbons having about 5, 9 or 10 carbon atoms derived from petroleum fractions;

(iii) terpene resins, optionally modified by the action of phenols;

(iv) copolymers based on natural terpenes; or (v) mixtures thereof.

5. The HMPSA as claimed claim 1, wherein the softening temperature of the tackifying resin or resins is between 95 to 110° C.

6. The HMPSA as claimed in claim 1, further comprising mixtures of monocarboxylic fatty acids (α) in the form of fractions derived from animal or vegetable fats.

7. The HMPSA as claimed in claim 1, wherein the one or more polycarboxylic fatty acids is in the acid form.

8. The HMPSA as claimed in claim 1, wherein the HMPSA comprises:

40 to 50% by weight of the blend a) of triblock and diblock copolymers;

45 to 55% by weight of one or more tackifying resins b); and 1 to 5% by weight of one or more polycarboxylic fatty acids c).

9. The HMPSA as claimed in claim 1, further comprising 0.1 to 2% by weight of one-more stabilizers or antioxidants.

10. A multilayer system comprising:

an adhesive layer comprising an HMPSA of claim 1, a printable support layer adjacent said adhesive layer, comprising paper or polymer film having one or more layers; and a protective layer adjacent said adhesive layer.

11. The multilayer system as claimed in claim 10, wherein the printable support layer is an oriented polypropylene (OPP)/polyethylene terephthalate (PET) bilayer film, the OPP layer being adjacent the adhesive layer.

12. A self-adhesive label obtained by removing the protective layer of the multilayer system of claim 10.

13. An article coated with the label as defined in claim 12.

14. The article as claimed in claim 13, comprising a package or container made of glass or plastic.

15. The article of claim 14, wherein said article comprises a glass bottle.

16. A process for recycling a labeled article of claim 13, comprising a step of debonding the label by immersing the article in a basic aqueous solution maintained at a temperature of between 60 and 100° C.

* * * * *

UNITED STATES PATENT AND TRADEMARK OFFICE

CERTIFICATE OF CORRECTION

PATENT NO. : 8,715,797 B2
APPLICATION NO. : 12/525438
DATED : May 6, 2014
INVENTOR(S) : Fouquay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this
Twenty-ninth Day of September, 2015

Michelle K. Lee

Michelle K. Lee
*Director of the United States Patent and Trademark Office*